US011367983B2

(12) United States Patent
Maturo et al.

(10) Patent No.: US 11,367,983 B2
(45) Date of Patent: Jun. 21, 2022

(54) CONNECTION SYSTEM FOR TIERED STAGES

(71) Applicant: The Phoenix Company of Chicago, Inc., Naugatuck, CT (US)

(72) Inventors: John E. Maturo, Thomaston, CT (US); Robert M. Bradley, Oakville, CT (US)

(73) Assignee: The Phoenix Company of Chicago, Inc., Naugatuck, CT (US)

( * ) Notice: Subject to any disclaimer, the term of this patent is extended or adjusted under 35 U.S.C. 154(b) by 0 days.

(21) Appl. No.: 17/110,738

(22) Filed: Dec. 3, 2020

(65) Prior Publication Data

US 2021/0119392 A1 Apr. 22, 2021

Related U.S. Application Data

(60) Continuation of application No. 16/825,488, filed on Mar. 20, 2020, now Pat. No. 10,886,676, which is a (Continued)

(51) Int. Cl.

*H01R 24/54* (2011.01)
*H01R 43/26* (2006.01)
*H01R 13/631* (2006.01)
*G06N 10/00* (2022.01)
*H01R 13/17* (2006.01)
*H01R 13/6473* (2011.01)
*H01R 13/7197* (2011.01)
*H01R 9/05* (2006.01)

(52) U.S. Cl.

CPC ........... *H01R 24/542* (2013.01); *G06N 10/00* (2019.01); *H01R 13/17* (2013.01); *H01R 13/6315* (2013.01); *H01R 13/6473* (2013.01); *H01R 13/7197* (2013.01); *H01R 43/26* (2013.01); *H01R 9/0524* (2013.01)

(58) Field of Classification Search

CPC ................................ H01R 4/68; H01R 13/521

See application file for complete search history.

(56) References Cited

U.S. PATENT DOCUMENTS 3,011,143 A 10/1959 Dean
3,694,793 A 9/1972 Concelman
(Continued)

FOREIGN PATENT DOCUMENTS

EP 2546936 1/2013

*Primary Examiner* — Jean F Duverne
(74) *Attorney, Agent, or Firm* — DeLio Peterson & Curcio LLC; Robert Curcio

(57) ABSTRACT

A connection system for a quantum computer that employs constant impedance connectors with attenuation or filtering components or both embedded therein or within an adaptor removably insertable within an adaptor housing for use in a cryogenically cooled quantum computer. The connection system provides a higher density of cables traversing through a hermetic sealed top plate, and which are accessible to chill blocks to reduce the thermal energy from the signal lines. Attenuators or filter circuits are embedded in the constant impedance connector housings, or provided in adaptors that connect on each end to form mating constant impedance connections, in order to reduce signal strength as the signal progresses through the cryogenic environment and to remove extraneous electrical signal noise.

18 Claims, 11 Drawing Sheets

Related U.S. Application Data continuation of application No. 16/392,821, filed on Apr. 24, 2019, now Pat. No. 10,777,950, which is a division of application No. 15/989,328, filed on May 25, 2018, now Pat. No. 10,320,133, which is a continuation-in-part of application No. 15/608,168, filed on May 30, 2017, now Pat. No. 10,049,788.

(56) References Cited

U.S. PATENT DOCUMENTS

| | | | | |
|---|---|---|---|---|
| 4,212,510 | A | 7/1980 | Ritchie et al. | |
| 4,880,397 | A * | 11/1989 | Dawson, Jr. | H01R 13/7195 439/620.09 |
| 5,055,068 | A | 10/1991 | Machura | |
| 5,201,855 | A | 4/1993 | Ikola | |
| 5,269,704 | A | 12/1993 | Ohashi | |
| 5,360,330 | A | 11/1994 | Jensen | |
| 5,453,026 | A * | 9/1995 | Ikegami | H01R 24/50 439/579 |
| 6,224,421 | B1 | 5/2001 | Maturo | |
| 6,595,801 | B1 | 7/2003 | Leonard | |
| 6,863,565 | B1 | 3/2005 | Kogan | |
| 6,905,367 | B2 | 6/2005 | Crane | |
| 7,029,286 | B2 | 4/2006 | Hall | |
| 7,101,226 | B1 * | 9/2006 | Gilliland | H01R 13/652 439/620.01 |
| 7,972,172 | B2 | 7/2011 | Huang | |
| 9,559,480 | B2 | 1/2017 | Bradley et al. | |
| 10,049,788 | B1 | 8/2018 | Maturo | |
| 2001/0053228 | A1 | 12/2001 | Jones | |
| 2002/0025719 | A1 | 2/2002 | Dingenotto | |
| 2002/0176137 | A1 | 12/2002 | BuAbbud | |
| 2003/0224660 | A1 | 12/2003 | Brooks et al. | |
| 2004/0235357 | A1 * | 11/2004 | Allison | H01R 12/7088 439/660 |
| 2005/0176268 | A1 | 8/2005 | Zaderej | |
| 2005/0215121 | A1 | 9/2005 | Tokunaga | |
| 2006/0139117 | A1 | 6/2006 | Brunker | |
| 2008/0045079 | A1 | 2/2008 | Minich | |
| 2008/0231527 | A1 | 9/2008 | Lemke | |
| 2011/0281461 | A1 | 11/2011 | Yan | |
| 2013/0164955 | A1 | 6/2013 | Tamai | |
| 2013/0273756 | A1 | 10/2013 | Stoner | |
| 2014/0253259 | A1 | 9/2014 | Holland | |
| 2015/0079819 | A1 | 3/2015 | Tamai | |
| 2016/0141807 | A1 | 5/2016 | Gailus | |
| 2017/0069986 | A1 | 3/2017 | Horning | |

* cited by examiner

CONNECTION SYSTEM FOR TIERED STAGES

BACKGROUND OF THE INVENTION

1. Field of the Invention

The present invention relates to a constant impedance connector system, utilizing the characteristics of known constant impedance connectors, some with embedded attenuation and/or filtering components. The constant impedance connector system is designed for use in computer technology, and to the connection system for a quantum computer. More specifically, the present invention may be adapted for use in a cryogenically cooled quantum computer. The constant impedance connectors may be in the form of replaceable adapters.

2. Description of Related Art

Today's computer work by manipulating bits that exist in one of two states: a 0 or a 1. Quantum computers, however, are not limited to two states; they encode information as quantum bits, or qubits, which can exist in superposition. Qubits represent atoms, ions, photons, or electrons and their respective control devices that are working together to act as computer memory and/or a processor. Because a quantum computer can contain these multiple states simultaneously, it has the potential to be millions of times more powerful than today's most powerful supercomputers.

This superposition of qubits is what gives quantum computers their inherent parallelism. This parallelism allows a quantum computer to work on a million computations at once.

As the physical attributes of the qubits continue to advance, meeting the challenge of realizing a quantum machine requires the engineering of new hardware and control architectures with complexity far beyond today's systems. One such system advancement is the implementation of computing at cryogenic temperatures using superconductor-based components. There are many benefits of cryogenic operation, such as: increased mobility and saturation velocity of the carriers, leading to higher operation speed; lower noise levels; increased electrical conductivity; increased integration densities; and the suppression of thermally activated degradation processes, to name a few. The drawbacks of cryogenic operation include: the necessity for an appropriate cooling system; the selection of materials and components optimized for low temperature operation; and, interfacing aspects between "cold" and "warm" electronics, among others.

SUMMARY OF THE INVENTION

Bearing in mind the problems and deficiencies of the prior art, it is therefore an object of the present invention to provide a connection system capable of operating in a cryogenic environment with the ability to traverse through an external or "warm" environment to an internal or "cold" environment.

It is another object of the present invention to provide a connection system that presents a higher density of cables than the current state-of-the-art assemblies.

It is a further object of the present invention to accommodate system electrical attenuation in a cryogenic environment in order to reduce the thermal energy resulting from transmitted signal power.

It is another object of the present invention to establish a hermetic seal in-line with the system cabling.

It is another object of the present invention to provide a connection system that can be installed within a quantum computer operating system, and which can be easily assembled in the computer system without damage to the extremely small diameter center conductors of the cabling.

It is yet another object of the present invention to accommodate system electrical filtering in a cryogenic environment in order to reduce extraneous electrical signals (noise) coupled onto conductors.

The above and other objects, which will be apparent to those skilled in the art, are achieved in the present invention which is directed to a connection system for transmitting signal cables through tiered stages, wherein at least one stage comprises: a first signal cable having a center conductor terminated by a first receptacle connector or first plug connector; a header housing plate, the header housing plate having a first header housing receptacle connector or a first header housing plug connector mounted on a first side, and a second header housing receptacle connector or a second header housing plug connector mounted on a second side opposite the first side, wherein the first header housing connector on the first side is complementary to the first receptacle connector or the first plug connector of the first signal cable.

The first receptacle connector or first plug connector in conjunction with the first header housing receptacle connector or the first header housing plug connector form a constant impedance connector.

The connection system may further include a second signal cable having a center conductor terminated by a second receptacle connector or second plug connector, wherein the second receptacle connector is a complementary connector to the second header housing receptacle connector or the second header housing plug connector, such that the second receptacle connector attaches on the second side of the header housing plate.

The second receptacle connector or second plug connector in conjunction with the second header housing receptacle connector or the second header housing plug connector form a constant impedance connector.

The connection system may include a first or top plate for securing the header housing plate, such that the header housing plate is received within a removed portion of the first or top plate.

A removable attenuator or filter component may be connected at one end to the first receptacle connector or first plug connector and at an opposing end to the first header housing plug connector or first header housing receptacle connector, respectively, for signal attenuation and/or electrical signal filtering.

The first receptacle connector or the first plug connector of the first cable may include the attenuator or filter component embedded therein for signal attenuation and/or electrical signal filtering.

A resilient thermally and/or electrically conductive component may be attached exterior to the attenuator or filter component to transmit thermal and/or electrical energy away from the attenuator or filter component.

The resilient thermally and/or electrically conductive component can be slidable and compressible.

The connection system may include an adaptor housing having a plurality of apertures for mounting a plurality of attenuators or filter components, or both, each of the attenuators and/or filters associated with a signal cable, as well as a plug housing block attachable to the adaptor housing on a first side, and a receptacle housing block attachable to adaptor housing on a second side opposite the first side.

In a second aspect, the present invention is directed to a method of connecting electrical cables in a tiered staged connection system, comprising: mounting as a first stage a first top plate; mounting a header housing plate within the first top plate, such that the header housing plate is received within a portion of the top plate; mounting a first header housing receptacle connector or a first header housing plug connector on a first side of the header housing plate; mounting a second header housing receptacle connector or a second header housing plug connector on a second side of the header housing plate opposite the first side connecting a first receptacle connector or a first plug connector having a first signal cable to the first header housing receptacle connector or the first header housing plug connector; and connecting a second receptacle connector or a second plug connector having a second signal cable to the second header housing receptacle connector or the second header housing plug connector; such that either the first header housing receptacle connector or the first head housing plug connector attaches to the first receptacle connector or a first plug connector, respectively, in a constant impedance cable connection, or the second header housing receptacle connector or the second header housing plug connector attaches to the second receptacle connector or a second plug connector, respectively, in a constant impedance cable connection.

The method may further include connecting a removable attenuator or filter component at one end to the first header housing receptacle connector or the first header housing plug connector and at an opposing end to the second header housing receptacle connector or the second header housing plug connector for signal attenuation and/or electrical signal filtering.

The method may include mounting an adaptor housing as a second stage, the adaptor housing having a removably insertable adaptor in electrical communication with the second receptacle connector or a second plug connector second signal cable, such that electrical connections are extended from the first stage to the second stage.

An attenuation or filtering component or both may be embedded within the adaptor.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
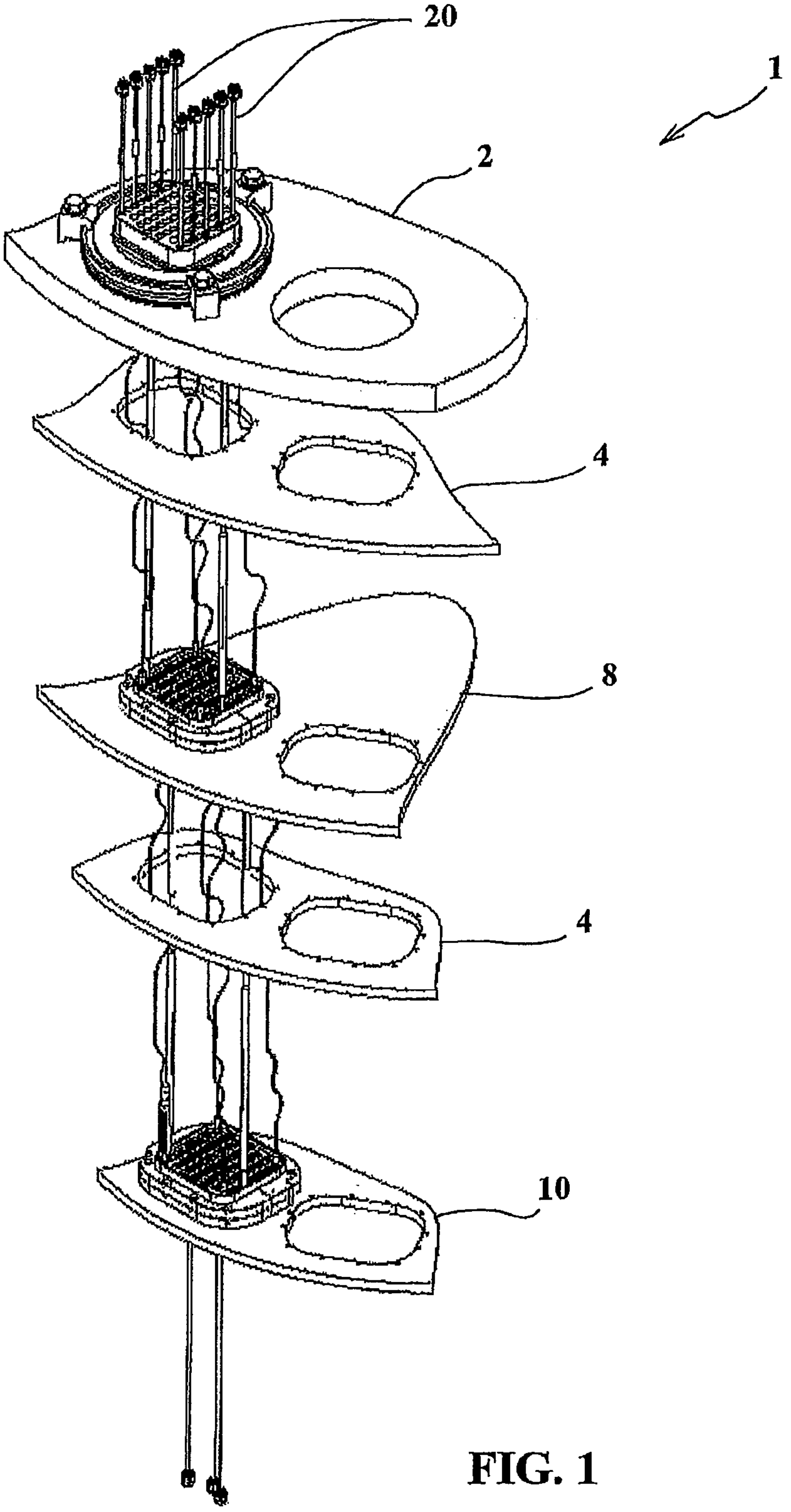
FIG. 1 is a perspective view of one embodiment of the connector system of the present invention.

In describing the preferred embodiment of the present invention, reference will be made herein to FIGS. 1-11 of the drawings in which like numerals refer to like features of the invention.

The present invention provides a connection system for electrical signals. The invention is preferably used to accommodate computer architecture, and preferably quantum computer architecture, although uses outside of computer architecture are not prohibited. For illustrative purposes, the application of the connection system of the present invention is demonstrated in computer architecture; however, other uses for electrical signal protection using the connection system are not precluded.

In one embodiment, the present invention lends itself to operation in a cryogenically cooled environment, although the present invention is not limited to cryogenically cooled environment applications. The need for reducing input power that would otherwise provide degrading thermal effects to the internal system is mitigated through the introduction of attenuators embedded within the housing of specialized constant impedance connectors, or formed as adapters that are designed to extend a constant impedance connection. In both instances the connectors are designed with a direct thermal connection to heat sinking elements, such as refrigeration plates, or the like. In certain instances, the attenuators are cryogenically-design. Similarly, in lieu of, or in addition to, attenuators, the present invention may also accommodate filters that are either embedded within the housing of specialized constant impedance connectors or attached as adapters to extend the constant impedance connections.

The design for embedding attenuators or providing an attenuating adaptor that extends a constant impedance connector readily lends itself to the implementation of filtering components within the connector or adaptor housing to reduce unwarranted coupling on the signal lines. In this manner, extraneous power on the line is further reduced by shunting at least a portion of the electrically coupled noise to ground before it travels to the colder portions of the cryogenically cooled environment.

Standardized constant impedance connectors accommodate large radial and axial misalignment tolerances found in modular applications. Constant impedance technology, as that found in the PkZ® connectors of Palco Connector, Inc., of Naugatuck, Conn.—an affiliate of The Phoenix Company of Chicago—ensures constant impedance with low insertion forces and no internal engagement spring. These connectors provide consistent performance by maintaining constant impedance over the larger Z-axis mating gaps caused by system and connector tolerance challenges. This is advantageous over the SMA connectors of the prior art, which are generally threaded and unable to accommodate movement of components at low temperatures. The Palco PkZ® connectors are implemented in this design as exemplary constant impedance connectors that will maintain signal integrity in a challenging environment.

The operating signals may be either RF or digital signals, typically in frequencies less than 40 GHz, but may be as high as 40 GHz to 60 GHz, with approximately 1 watt max power. This is in contrast to SMA connectors currently found in the art, which operate on the order of less than 20 GHz.

FIG. 1 is a perspective view of one embodiment of the connector system 1 of the present invention. The input signals travel through connector system 1 via mounting and connecting blocks with cables extending there between. Top plate 2 receives input cables 20 from an external, uncontrolled or less controlled environment, such as a less controlled temperature environment. The center conductors of the cables pass through top plate 2 in a manner that secures and maintains a hermetic seal. After traversing through top plate 2, the signals are carried via cabling through at least one additional plate 4, which may be a plate used for heat sinking, and more preferably, a plurality of plates, to reduce and maintain a lower temperature for cryogenic applications. Such plates act as heat sinks for thermal energy, which aid in prohibiting the thermal energy from transmitting further down the connector system. The signals are then connected via cabling to a lower housing stage 8 which is downstream of the top plate 2, and which utilizes a modified constant impedance connector, such as a PkZ® connector. The signal lines then traverse to a bottom housing stage 10 through which the signal lines then progress to the internal computer electronics.

Figure 4:
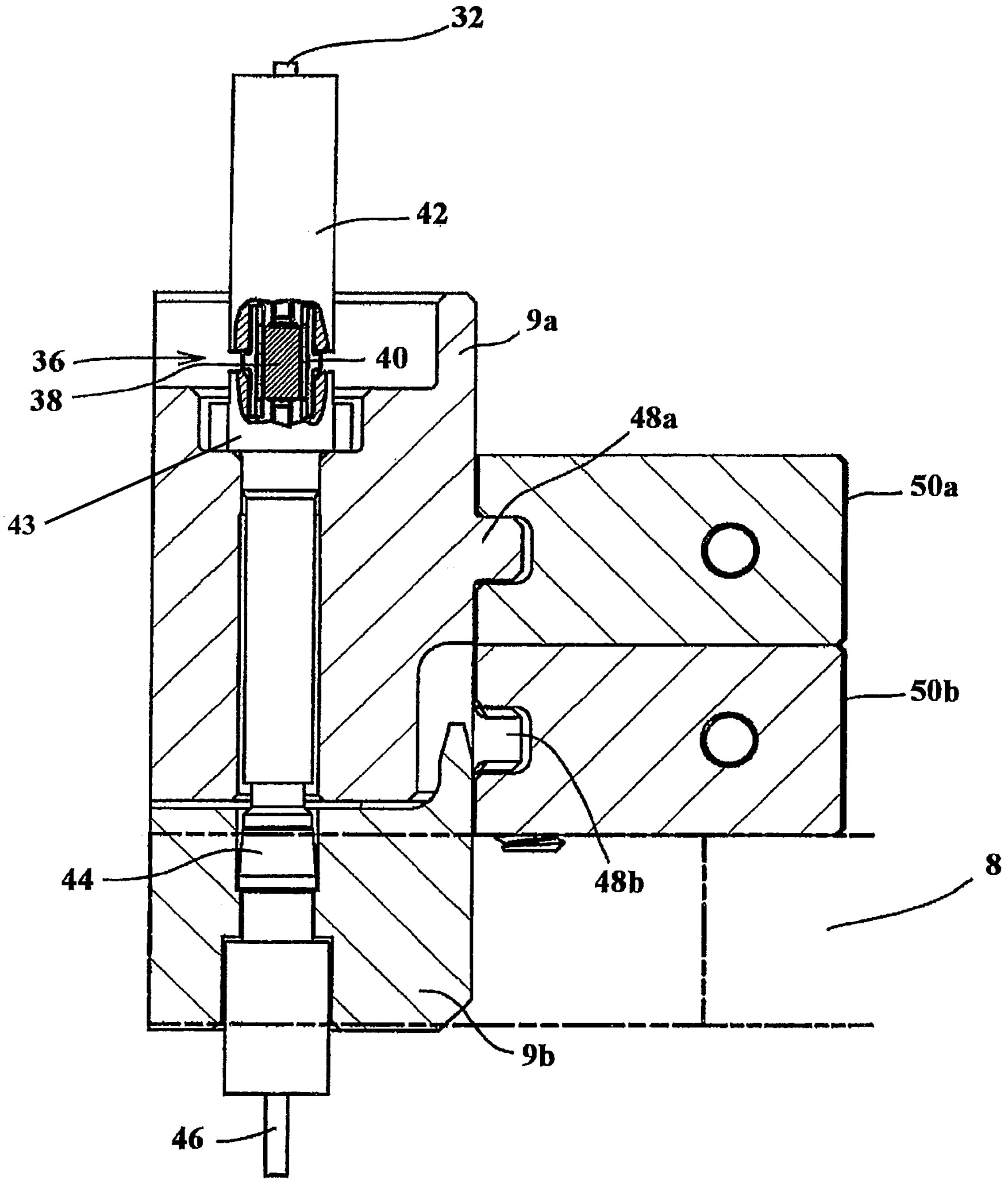
FIG. 4 depicts the center stage of the connector system where signal attenuation is achieved.

As will be discussed in further detail below, the modification of the constant impedance connection may be presented in different distinct designs and at different stages. For example, in a first embodiment, an attenuator or filter is embedded in either a constant impedance connector receptacle or plug. As depicted in FIG. 4, the connector receptacle is installed into a receptacle housing block 9*a,* and the connector plug is installed into a plug housing block 9*b,* such that when the receptacle housing block 9*a* is mated to the plug housing block 9*b,* the receptacle and plug connectors are mated as well. This allows for proper alignment of the contacts and thermal dissipation through the housing blocks.

In a second embodiment an attenuator component or filter component adaptor is employed within its own adapter body which is then mounted into an adaptor housing, which preferably accommodates a plurality of adaptor bodies. The adaptor housing is then mounted to a plate, such as a refrigeration plate. The adaptor housing will receive on one side connectors from a receptacle housing block, and on the other side connectors from a plug housing block. It is also possible for an adaptor housing to be designed to receive connectors from a receptacle housing block on both sides, or connectors from a plug housing block on both sides, such that, in either embodiment, a constant impedance connection is made on each side of the adaptor housing.

The attenuator lowers the power on each center conductor without changing the signal integrity. In cooling applications, the excess thermal energy from the attenuated signals is then dissipated through the housing to a heat sink, such as refrigeration plate. The system is designed to accommodate a plurality of such heat sinks. Additional plates may have further attenuation components for further signal conditioning. External cabling then extends from bottom housing stage 10 to the computer internal electronics, and ultimately to the processor.

It is noted that for optimum operation of the connection system within a quantum computer application most or approximately all of the materials of the connection system are designed of non-magnetic material. For other applications, non-magnetic material may not be necessitated.

Figure 2:
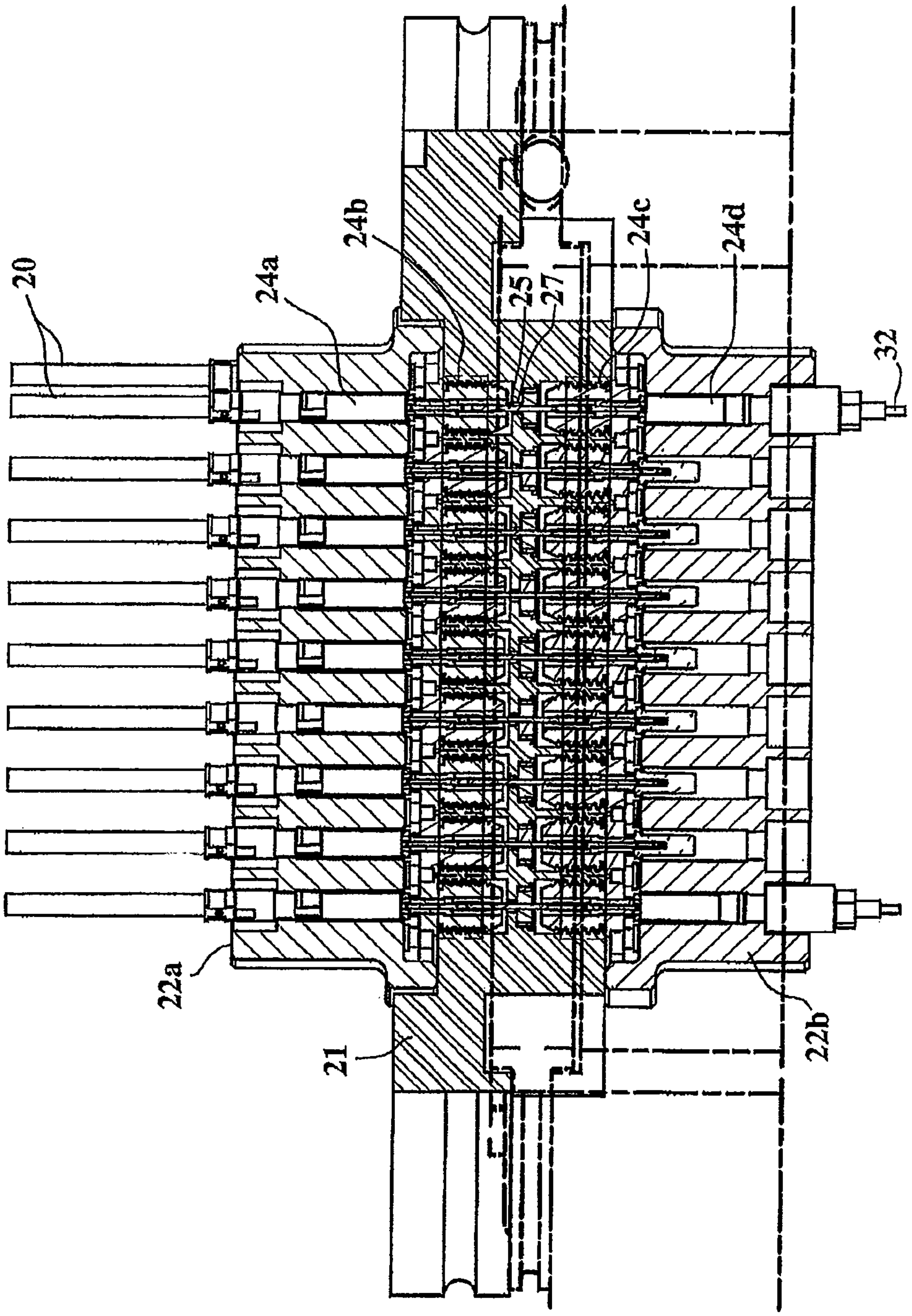
FIG. 2 is a cross-sectional view of the top plate of the connector system of FIG. 1 with a hermetic header housing attached thereto.

FIG. 2 is a cross-sectional view of top plate 2 of connector system 1 with a hermetic header housing 21. Top plate 2 introduces a hermetic seal in the signal lines. This is accomplished by mounting hermitic header housing 21 on top plate 2. Hermetic header housing 21 passes through an aperture in top plate 2. In this manner, downstream signal cables and electronics are sealed from the outside environment. In this embodiment, on one side of top plate 2, incoming cables 20 are attached to a connector housing 22*a.* Connector housing 22*a* terminates the signal cables at a constant impedance receptacle connector 24*a.* Alternatively, the signal cables may be terminated at a constant impedance plug connector, as receptacles and plugs may be interchanged without loss of design function. The connector housing 22*a* then connects to the top side of the hermetic header housing 21. The hermetic header housing 21 on its top side has reciprocal constant impedance plugs 24*b* for mating with the constant impedance receptacles 24*a* of connector housing 22*a.* The center conductor 25 runs through a hermetic seal material 27 within the hermetic header housing 21. On the bottom side of top plate 2, which correlates with the bottom side of hermetic header housing 21, a constant impedance plug 24*c* is installed for each signal line. A connector housing 22*b* then connects to the bottom side of the hermetic header housing 21. Connector housing 22*b* has reciprocal constant impedance receptacle connectors 24*d* to mate with constant impedance plugs 24*c.*

Figure 3:
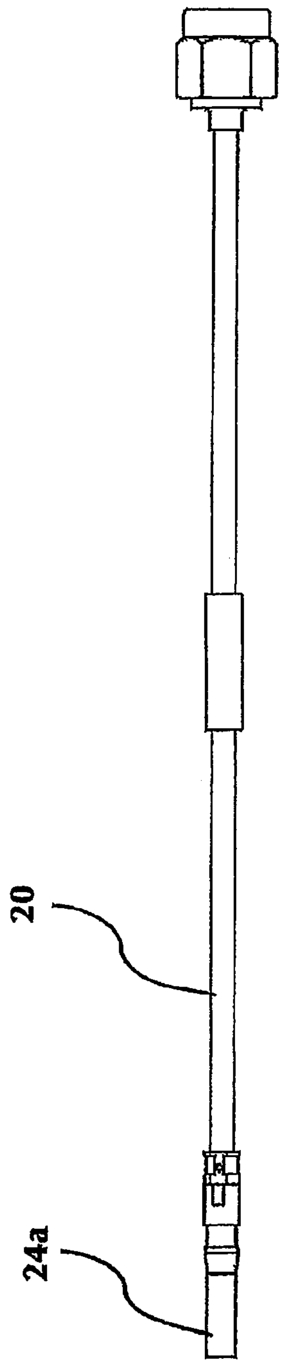
FIG. 3 depicts an illustrative example of an incoming cable with a connector housing for connection to the top plate of FIG. 2.

FIG. 3 depicts an illustrative embodiment of incoming cable 20 for installation into connector housing 22. A first, standard constant impedance receptacle 24*a* is attached thereto. The standard PkZ® receptacle is preferably a commercially available type constant impedance connector, such as that available from Palco Connector, Inc., or an equivalent thereof. It should be noted that where receptacles are utilized, plug connectors may be employed, and where plug connectors are utilized, receptacle connectors may be employed, without degradation to the constant impedance connection.

As will be discussed in further detail below, in an alternative embodiment, a second constant impedance mating plug may be introduced, which is mated with a second constant impedance receptacle. The second receptacle is altered from the first receptacle discussed above insomuch as the second receptacle requires a different internal termination to accommodate a different cable, allowing the connection to proceed from a generally standard cabling material to cabling 32, which may be superconducting cabling material. In this manner, different cabling may be used under a similar connection scheme.

Following the signal cabling from the external environment towards the cryogenically cooled environment, through the hermetic seal stage, the cabling extends from connector housing 22$b$ to lower housing stage 8. FIG. 4 depicts a cross-sectional view of a portion of lower housing stage 8. In this embodiment, the attenuator of the constant impedance connector is press-fitted within the receptacle housing 9$a$, and is thus not interchangeable or easily repairable. In other embodiments, the attenuator may be secured by a clip ring or mechanical retention retaining ring. As will be shown in a second embodiment, an attenuator or filter adaptor is interchangeable, and would connect on each end to a respective constant impedance receptacle or plug.

In FIG. 4, receptacle housing block 9$a$ performs an attenuation of the cable signals utilizing an embedded attenuator 38. Cabling 32 includes a constant impedance (PkZ®) receptacle 36. PkZ® receptacle 36 is modified to include, internally, attenuator 38. Attenuator 38 may be formed from discrete attenuator electronic components. Other attenuator components may be employed, provided their dimensions are acceptable for insertion within a modified constant impedance connector housing having an upper body portion and a lower body portion, such as PkZ® connector upper housing body portion 42 and lower housing body portion 43. Attenuator 38 may be any level of attenuation depending upon the system requirements. In one embodiment, a 20 dB attenuator is employed. Attenuator 38 is confined within an attenuator housing 40, which is secured within the modified PkZ® receptacle 36. A conductive or shield component 41 is disposed between the attenuator housing 40, and inner diameter of the upper and lower housing body portions 42, 43.

By attenuating the cable signals, energy is removed from the cables and shunted via the attenuator to the adjoining plate. In this manner, heat energy is kept further away from the internal computer electronics downstream.

Constant impedance receptacle 36 is then mated to a mating plug 44 which is inserted within, and secured by, mating plug housing block 9$b$. Mating plug 44 extends the signal conductor to a cable 46, which under certain circumstances may be a superconducting cable. Cable 46 does not necessarily have to be the same material as cable 32, and any mating plug would be designed to accommodate the different conducting cable material, including superconducting cabling material.

Receptacle and plug housing blocks 9$a$, 9$b$ are attached to, and in thermal communication with, lower housing stage 8 via a specialized clamp 50$a,b$. Clamp 50$a,b$ are each designed to hold extended ribs 48$a,b$ on the perimeter of each housing block 9$a,b$ respectively. Clamps 50$a,b$ are mechanically fastened to lower housing stage 8 on one side via a threaded or other removable attachment scheme. The bottom side of clamp 50$b$ is in thermal communication with lower housing stage 8.

Cables 46 extend from plug housing block 9$b$ and may traverse through one or more plates that may utilize heat sinks, and which may be configured in the same manner as described above.

Figure 5:
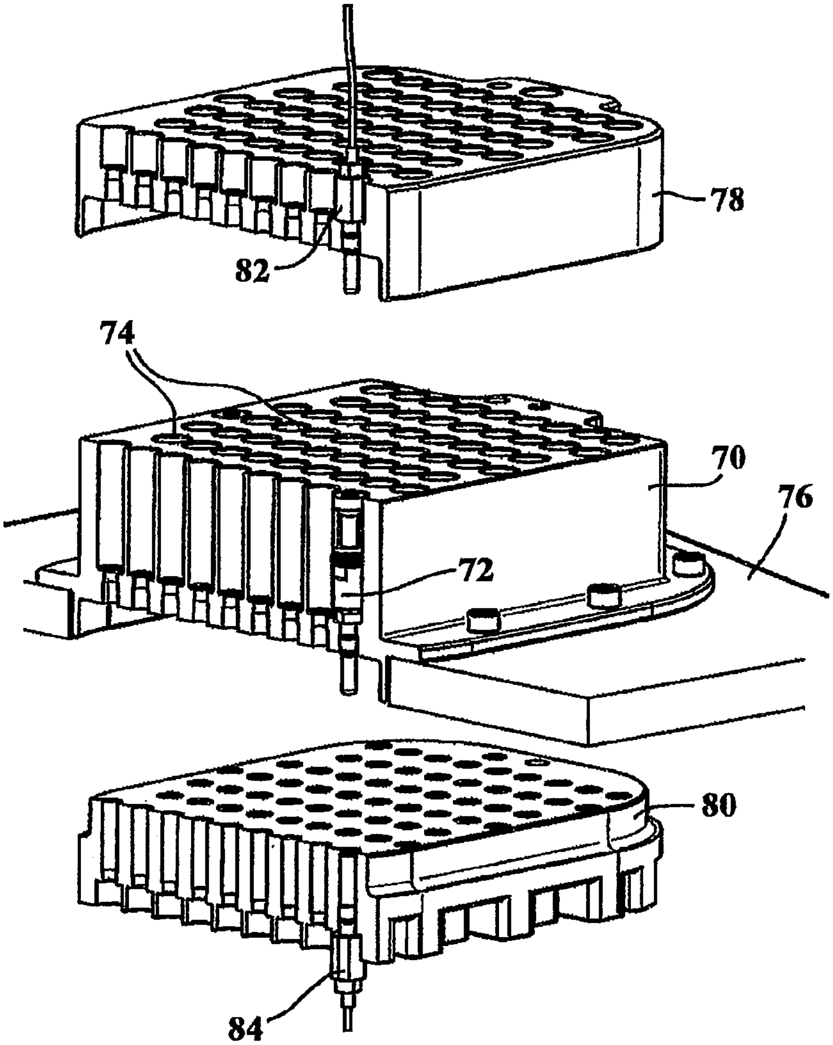
FIG. 5 depicts an exploded, perspective view of an adaptor housing that encloses a plurality of attenuator or filter components, each within respective apertures.

FIG. 5 depicts an exploded, perspective view of an adaptor housing 70 that encloses a plurality of attenuator or filter components 72, each within respective apertures 74, which for illustrative purposes shall be shown as cylindrical apertures although the present invention is not restricted to any given shape. Adaptor housing 70 is attached to plate 76, which is preferably a heat sink plate or a metal structure that provides either thermal conduction for transmitting heat energy, or ground potential for removing filtered signal noise, or both. A plug housing block 78 attaches to adaptor housing 70 on one side, and a receptacle housing block 80 attaches to adaptor housing 70 on the other side. The plug and receptacle housing blocks 78, 80 each house a mating section of a constant impedance connector, either the receptacle or the plug portion component 82, 84, respectively, for cable connection to the adaptor housing 70 on each side, respectively.

In this manner, one end of the receptacle or plug portion component 82, 84 is a mating constant impedance connector receptacle or plug, which is designed to mate with the complementary attenuator or filter component 72, such that a constant impedance connection is formed. The mating attachment is slidably connected to the receiving attachment on the attenuator or filter component 72. By this design, the attenuator or filter components 72 may be interchangeable, insomuch as attenuator components may be replaced with filter components, and vice versa. As an illustrative example, plug housing block 78 is depicted with a PkZ® plug, and receptacle housing block 80 is depicted with a PkZ® receptacle. The present invention can also accommodate the interchanging of plugs and receptacles so that the constant impedance connection is still maintained.

Figure 6:
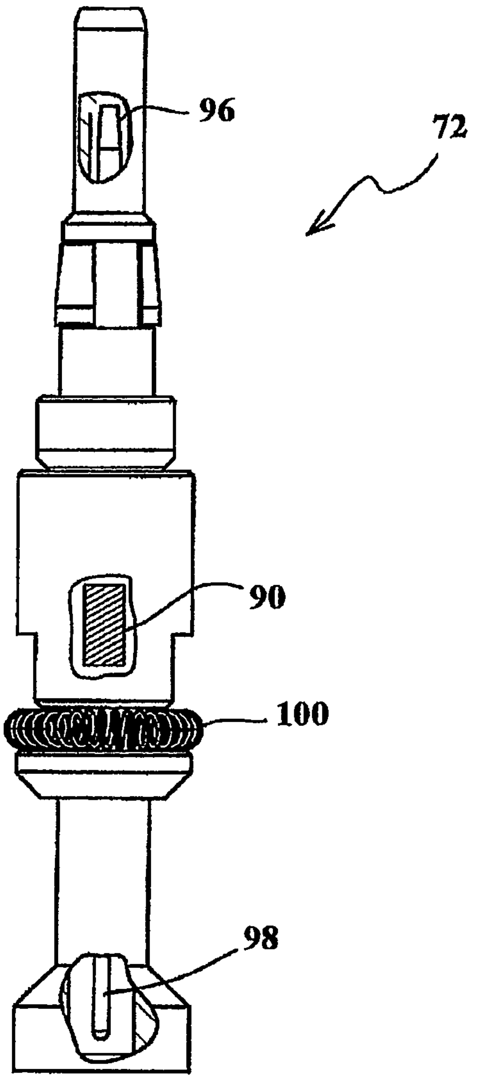
FIG. 6 depicts a cross-sectional view of the attenuator or filter component insertable within the adaptor housing of FIG. 5.

FIG. 6 depicts a partial cross-sectional view of the attenuator or filter component 72. This component includes an attenuator or filter circuit contained in its own removable casing 90 with electrical connections 96, 98 at each end. This attenuator or filter component 72 is insertable within aperture 74 of adaptor housing 70.

A resilient, thermally and/or electrically conductive component 100 is attached to the outside of attenuator or filter component 72 to transmit thermal energy from the attenuator or filter component 72 to the inner wall of aperture 74 upon insertion. The resilient thermally or electrically conductive component 100 may be in the form of a spring or other resilient structure for forming a slideable, compressible connection against the inner wall of aperture 74. The resilient component 100 provides movement and flexibility that a press-fit device (as depicted by the first embodiment above) cannot provide, while assuring improved thermal conductivity and/or electromagnetic interference protection.

Figure 7:
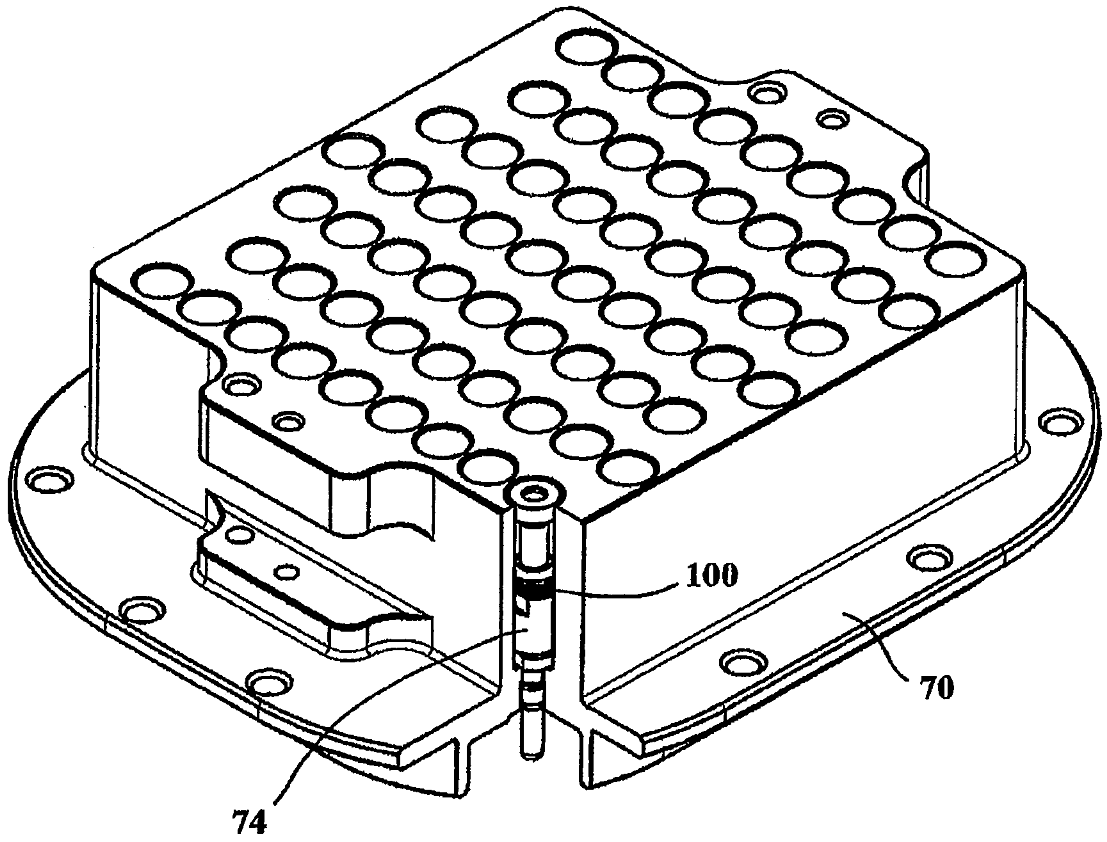
FIG. 7 depicts an exploded, perspective view of the adaptor housing of FIG. 5, where a section of the aperture is shown removed to expose the attenuator or filter component inserted therein.

FIG. 7 depicts an exploded, perspective view of adaptor housing 70 where a section of the aperture 74 is shown removed to expose the attenuator or filter component 72 inserted therein. As shown, resilient component 100 is circumferentially attached to attenuator or filter component 72 such that the outermost side of component 72 is compressibly fit against the inner wall of aperture 74.

Figure 8:
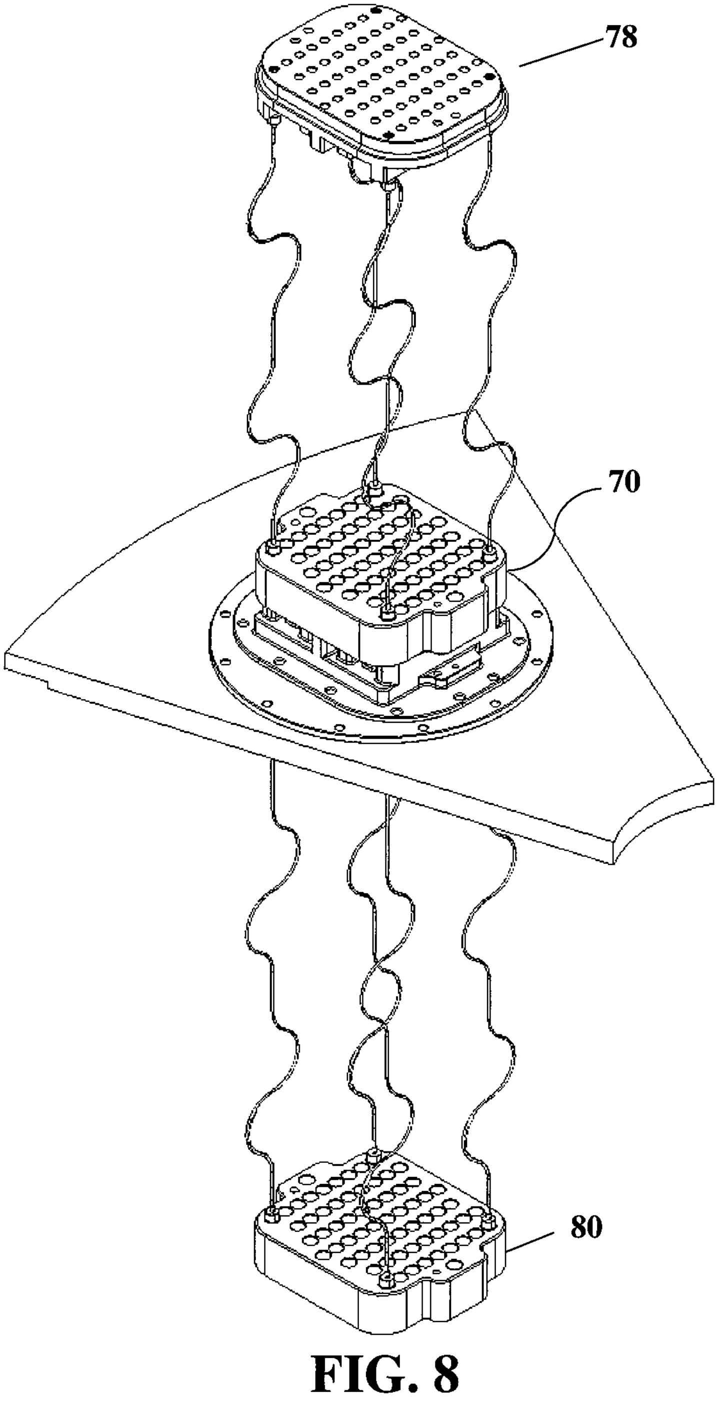
FIG. 8 depicts a plug housing block attached to the adaptor housing of FIG. 5 on one side, and receptacle housing block attached to adaptor housing on the other side.

FIGS. 8-11 depict the method steps for mating the connection system in a computer application. As depicted in FIG. 8, plug housing block 78 is attached to adaptor housing 70 on one side, and receptacle housing block 80 is attached to adaptor housing 70 on the other side, using fixing hardware. Adaptor housing 70 is populated with attenuation adaptors.

Figure 9:
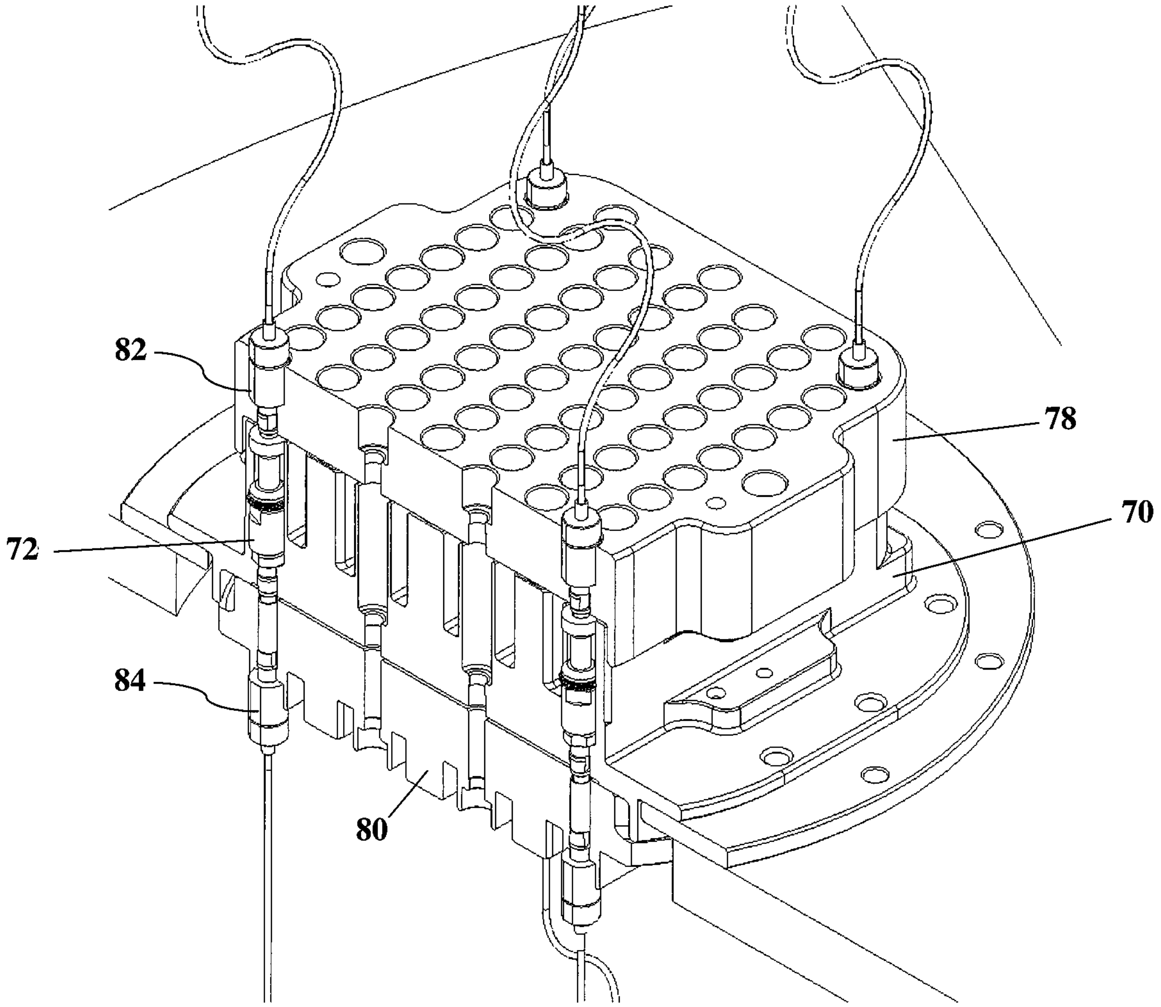
FIG. 9 depicts a cross-section of housing blocks mated to the adaptor housing with attenuation adaptors and plug connectors.

FIG. 9 depicts a cross-section of plug housing blocks 78, 80 mated to the adaptor housing 70 with attenuation adaptors 72 and plug connectors 82, 84 shown.

Figure 10:
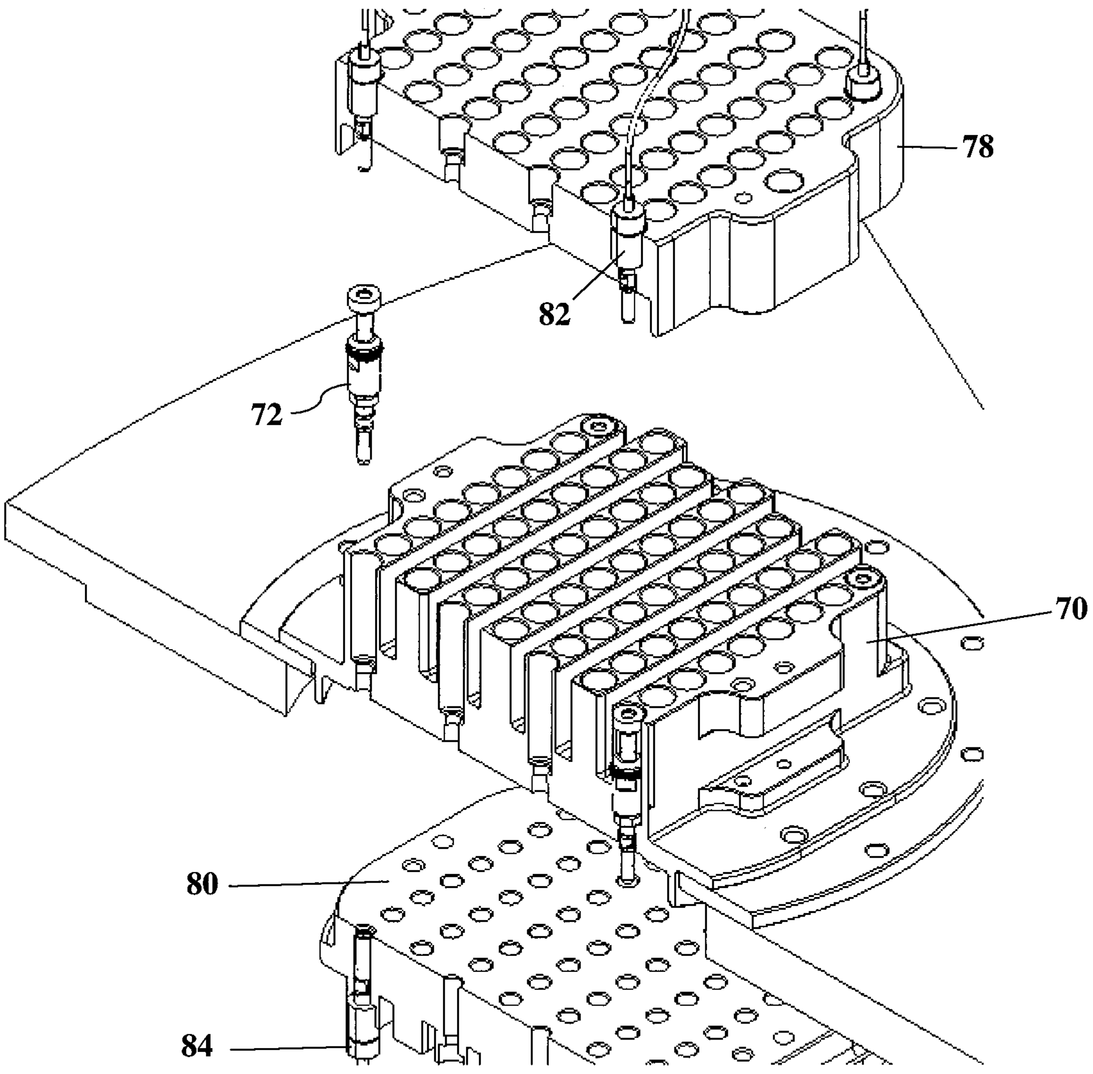
FIG. 10 depicts the separation of the housing blocks for replacement of the attenuation adaptors, and an attenuation adaptor removed therefrom.

In order to replace the attenuation adaptors 72, fixing hardware is removed on both the plug housing block and the receptacle housing block. The connector housings are then removed, and the attenuation adaptors are removed and replaced. FIG. 10 depicts the separation of the housing blocks for replacement of the attenuation adaptors, and an attenuation adaptor removed therefrom.

After separating the connector housing, the attenuation adaptors may be removed using appropriate tools. At this point, the entire housing may be removed for work outside of the connection system environment, or replaced with another housing containing different attenuation adaptors and/or other components.

Figure 11:
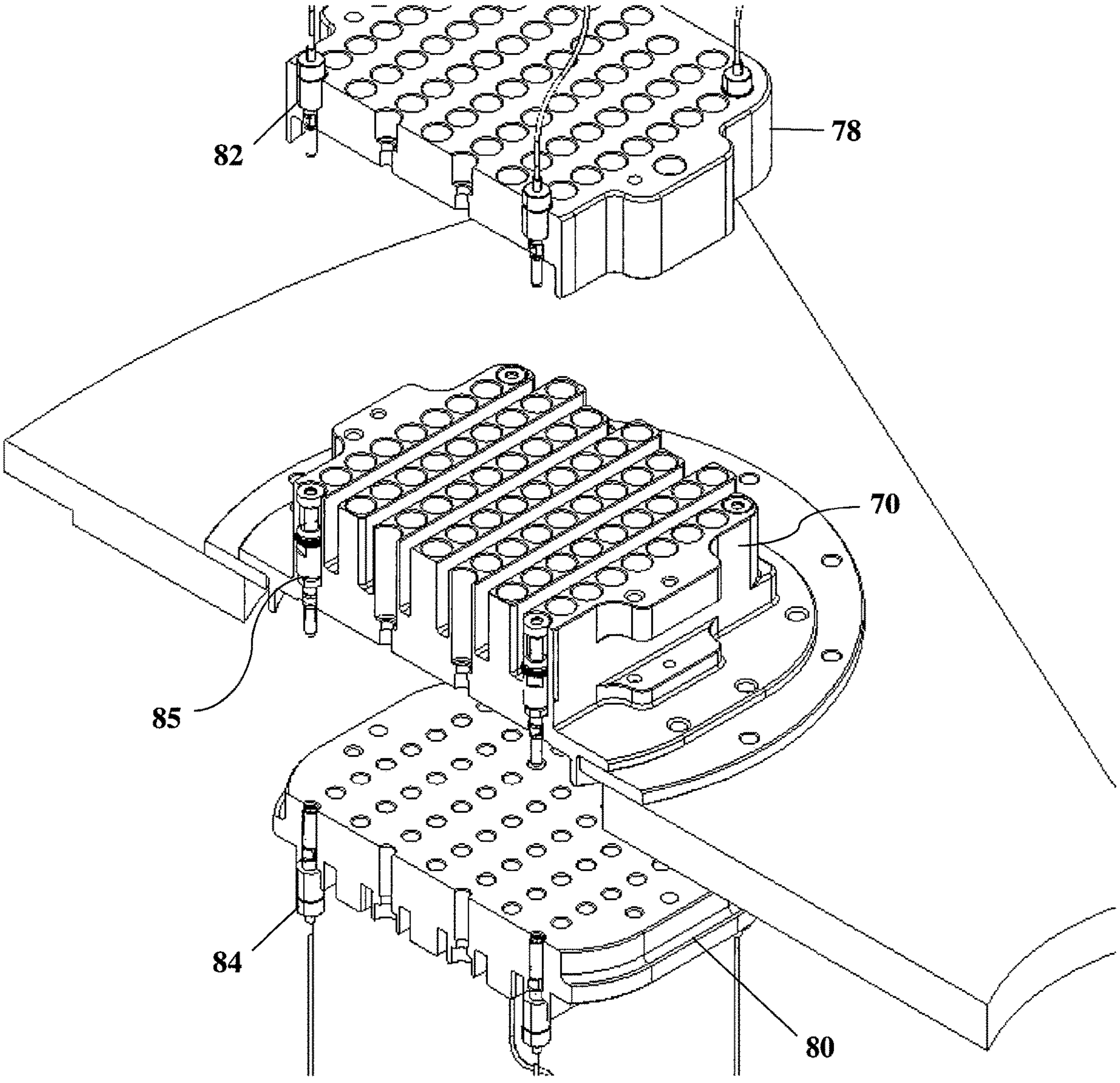
FIG. 11 depicts the separated housing blocks and the replacement of a new attenuation adaptor or other component.

FIG. 11 depicts the separated housings 78, 80 and the replacement of a new attenuation adaptor or other component 85. FIG. 12 depicts the reassembly of the connector housings 78, 80 and adaptor housing 70 with new attenuation adaptor 85.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A connection system for transmitting signal cables through tiered stages, wherein at least one stage comprises:

a first signal cable having a center conductor terminated by a first receptacle connector or first plug connector;

a header housing plate, said header housing plate having a first header housing receptacle connector or a first header housing plug connector mounted on a first side, and a second header housing receptacle connector or a second header housing plug connector mounted on a second side opposite said first side, wherein said first header housing connector on said first side is complementary to said first receptacle connector or said first plug connector of said first signal cable; and a first or top plate for securing said header housing plate, such that said header housing plate is received within a removed portion of said first or top plate.

2. The connection system of claim 1 wherein said first receptacle connector or first plug connector in conjunction with said first header housing receptacle connector or said first header housing plug connector form a constant impedance connector.

3. The connection system of claim 1 including a second signal cable having a center conductor terminated by a second receptacle connector or second plug connector, wherein said second receptacle connector is a complementary connector to said second header housing receptacle connector or said second header housing plug connector, such that said second receptacle connector attaches on said second side of said header housing plate.

4. The connection system of claim 3 wherein said second receptacle connector or second plug connector in conjunction with said second header housing receptacle connector or said second header housing plug connector form a constant impedance connector.

5. The connection system of claim 1 including a removable attenuator or filter component connected at one end to said first receptacle connector or first plug connector and at an opposing end to said first header housing plug connector or first header housing receptacle connector, respectively, for signal attenuation and/or electrical signal filtering.

6. The connection system of claim 5 wherein said first receptacle connector or said first plug connector of said first cable includes said attenuator or filter component embedded therein for signal attenuation and/or electrical signal filtering.

7. The connection system of claim 3, wherein said second receptacle connector or said second plug connector of said second cable includes an attenuator or filter component embedded therein for signal attenuation and/or electrical signal filtering.

8. The connection system of claim 1 including an adaptor housing having a plurality of apertures for mounting a plurality of attenuators or filter components, or both, each of said attenuators and/or filters associated with a signal cable.

9. The connection system of claim 8 including a plug housing block attachable to said adaptor housing on a first side, and a receptacle housing block attachable to adaptor housing on a second side opposite said first side.

10. The connection system of claim 9 wherein said plug housing block and/or said receptacle housing block house a mating section of a constant impedance connector.

11. The connection system of claim 8 wherein said adaptor housing is attached to a plate that provides either thermal conduction, ground potential, or both.

12. A connection system for transmitting signal cables through tiered stages, wherein at least one stage comprises:

a first signal cable having a center conductor terminated by a first receptacle connector or first plug connector;

a header housing plate, said header housing plate having a first header housing receptacle connector or a first header housing plug connector mounted on a first side, and a second header housing receptacle connector or a second header housing plug connector mounted on a second side opposite said first side, wherein said first header housing connector on said first side is complementary to said first receptacle connector or said first plug connector of said first signal cable;

a removable attenuator or filter component connected at one end to said first receptacle connector or first plug connector and at an opposing end to said first header housing plug connector or first header housing receptacle connector, respectively, for signal attenuation and/or electrical signal filtering; and a resilient thermally and/or electrically conductive component attached exterior to said attenuator or filter component to transmit thermal and/or electrical energy away from said attenuator or filter component.

13. The connection system of claim 12 wherein said resilient thermally and/or electrically conductive component is slidable and compressible.

14. A method of connecting electrical cables in a tiered staged connection system, comprising:

mounting as a first stage a first top plate;

mounting a header housing plate within said first top plate, such that said header housing plate is received within a portion of said top plate;

mounting a first header housing receptacle connector or a first header housing plug connector on a first side of said header housing plate;

mounting a second header housing receptacle connector or a second header housing plug connector on a second side of said header housing plate opposite said first side connecting a first receptacle connector or a first plug connector having a first signal cable to said first header housing receptacle connector or said first header housing plug connector; and connecting a second receptacle connector or a second plug connector having a second signal cable to said second header housing receptacle connector or said second header housing plug connector;

such that either said first header housing receptacle connector or said first head housing plug connector attaches to said first receptacle connector or a first plug connector, respectively, in a constant impedance cable connection, or said second header housing receptacle connector or said second header housing plug connector attaches to said second receptacle connector or a second plug connector, respectively, in a constant impedance cable connection.

15. The method of claim 14 including connecting a removable attenuator or filter component at one end to said first header housing receptacle connector or said first header housing plug connector and at an opposing end to said second header housing receptacle connector or said second header housing plug connector for signal attenuation and/or electrical signal filtering.

16. The method of claim 14 including mounting an adaptor housing as a second stage, said adaptor housing having a removably insertable adaptor in electrical communication with said second receptacle connector or a second plug connector second signal cable, such that electrical connections are extended from said first stage to said second stage.

17. The method of claim 16 including embedding an attenuation or filtering component or both within said adaptor.

18. The method of claim 17 wherein said embedding of said attenuation or filtering component includes contacting a resilient thermally and/or electrically conductive component attached exterior to said attenuator or filter component with said adaptor in order to transmit thermal and/or electrical energy away from said attenuator or filter component.

* * * * *